(12) United States Patent
Stratmann et al.

(10) Patent No.: US 8,476,590 B2
(45) Date of Patent: Jul. 2, 2013

(54) THERMAL IMAGING CAMERA FOR TAKING THERMOGRAPHIC IMAGES

(71) Applicants: Martin Stratmann, Freiburg (DE); Andreas Messerschmid, Titisee-Neustadt (DE); Patrick Zahn, Titisee-Neustadt (DE); Matthias Schmieder, Freiburg im Breisgau (DE)

(72) Inventors: Martin Stratmann, Freiburg (DE); Andreas Messerschmid, Titisee-Neustadt (DE); Patrick Zahn, Titisee-Neustadt (DE); Matthias Schmieder, Freiburg im Breisgau (DE)

(73) Assignee: Testo AG, Lenzkirch (DE)

( * ) Notice: Subject to any disclaimer, the term of this patent is extended or adjusted under 35 U.S.C. 154(b) by 0 days.

(21) Appl. No.: 13/715,275

(22) Filed: Dec. 14, 2012

(65) Prior Publication Data
US 2013/0135480 A1 May 30, 2013

Related U.S. Application Data

(63) Continuation of application No. 12/634,759, filed on Dec. 10, 2009, now Pat. No. 8,410,441.

(60) Provisional application No. 61/122,142, filed on Dec. 12, 2008.

(30) Foreign Application Priority Data

Dec. 9, 2009 (EP) .................................. 09015237

(51) Int. Cl.
*G02F 1/01* (2006.01)

(52) U.S. Cl.
USPC ........................................................ 250/330

(58) Field of Classification Search
USPC ................................................. 250/330, 334
See application file for complete search history.

(56) References Cited

U.S. PATENT DOCUMENTS

| 4,677,297 | A  * | 6/1987 | Egerod ......................... 250/334 |
| 5,909,242 | A    | 6/1999 | Kobayashi et al. |
| 6,787,775 | B1   | 9/2004 | Bielefeld et al. |
| 7,459,685 | B2   | 12/2008 | Ikeda |
| 2002/0163582 | A1 | 11/2002 | Gruber et al. |
| 2003/0197124 | A1 | 10/2003 | Wood |
| 2006/0049350 | A1 | 3/2006 | Teich et al. |
| 2006/0249679 | A1 | 11/2006 | Johnson et al. |
| 2006/0289768 | A1 | 12/2006 | Vallese et al. |
| 2007/0235648 | A1 | 10/2007 | Teich et al. |
| 2008/0210870 | A1* | 9/2008 | Remillard et al. ............. 250/330 |

FOREIGN PATENT DOCUMENTS

| EP | 0 878 963 A1 | 11/1998 |
| EP | 1 379 073 A1 | 1/2004 |
| JP | 2004-056199 | 2/2004 |
| WO | 03/091948 A1 | 11/2003 |
| WO | 2005/041564 A1 | 5/2005 |

OTHER PUBLICATIONS

Search Report dated Sep. 8, 2010 from European Patent Application No. 09015237.2 with excerpts.
Muller et al., "Real-time processing and fusion for a new high-speed dual-band infrared camera," 2007, SPIE Proceedings, vol. 6543, pp. 654310-1 to 654310-9.

* cited by examiner

*Primary Examiner* — Kiho Kim
(74) *Attorney, Agent, or Firm* — Hoffmann & Baron, LLP

(57) ABSTRACT

In a thermal imaging camera for acquisition of thermographic images of a measurement object, an electronic evaluation unit is integrated into the thermal imaging camera; it is designed for recognition of corresponding partial regions of the acquired thermographic images, and with it, the acquired images can be assembled into an overall image by overlapping the corresponding partial regions and displayed. The acquisition of the images preferably takes place during the swiveling of the thermal imaging camera over the solid angle region of the desired overall image.

20 Claims, 9 Drawing Sheets

THERMAL IMAGING CAMERA FOR TAKING THERMOGRAPHIC IMAGES

CROSS-REFERENCES TO RELATED APPLICATIONS

This application is a continuation of U.S. application Ser. No. 12/634,759, filed on Dec. 10, 2009, now allowed, and which claims the benefit of priority of European Patent Application No. 09 015 237.2, filed Dec. 9, 2009, and the benefit of U.S. Provisional Application No. 61/122,142, filed Dec. 12, 2008, the entire contents of which are incorporated herein by reference.

TECHNICAL FIELD

The invention concerns a thermal imaging camera for taking thermographic images of a measurement object in the infrared region with an indicator tool built in or on the housing for a representation of the taken thermographic images, where the thermal imaging camera is made as a hand-held unit. The representation of the thermographic images may use any kind of color mapping, e.g. false color representation, grey tone representation, and the like.

The invention additionally concerns a method for generating a thermographic image of a large measurement object.

DESCRIPTION OF THE PRIOR ART

A system for dual band acquisition of infrared images in which the IR images acquired in two spectral bands are combined into an image by overlapping by means of image processing in a computer system is known from the publication of M. Muller et al.: "Real-time image processing and fusion for a new high-speed dual-band infrared camera."

A digital photo apparatus for taking images in the visible spectral region in which an objective head is designed so that it can rotate in manual or automatic mode on the housing is known from DE 203 05 457 U1.

A digital camera for taking images in the visible spectral region in which a one-dimensional panoramic image can be generated is known from US 2005/0206743 A1.

Thermal imaging cameras are frequently used to take thermographic images, thus images optically acquired in the infrared spectral region, in which temperature information obtained from the images taken of structures or parts of structures is represented in a false color representation, thus by means of a false color scale, or by brightness scales, or grey scales. From the thermographic images it is possible to obtain, among other things, information about the building's condition, such as condition of insulation, water damage and/or mold damage, and also for surveillance of room areas and for monitoring or control of manufacturing processes.

In taking images of buildings, it is required, on the one hand, to take an overall image and, on the other hand, to take individual images of portions of the building that are as detailed as possible. This produces high demands on the maximum possible resolution of the sensor field of the thermal imaging camera and, if the thermal imaging camera has an integrated display tool, on the maximum possible resolution of said display tool.

Since a high maximum possible resolution gives rise to high manufacturing costs, especially, for the detector field of the thermal imaging camera, one makes due by, optionally with a wide-angle lens, first taking an overall picture and then taking the additional individual pictures of the parts of the building that are of interest using a telephoto lens, where the individual pictures offer higher resolution because of the smaller section that is chosen. Preferably the position of these individual pictures is entered into a printout of the overall picture for a better subsequent evaluation.

DETAILED DESCRIPTION

Figure 1A:
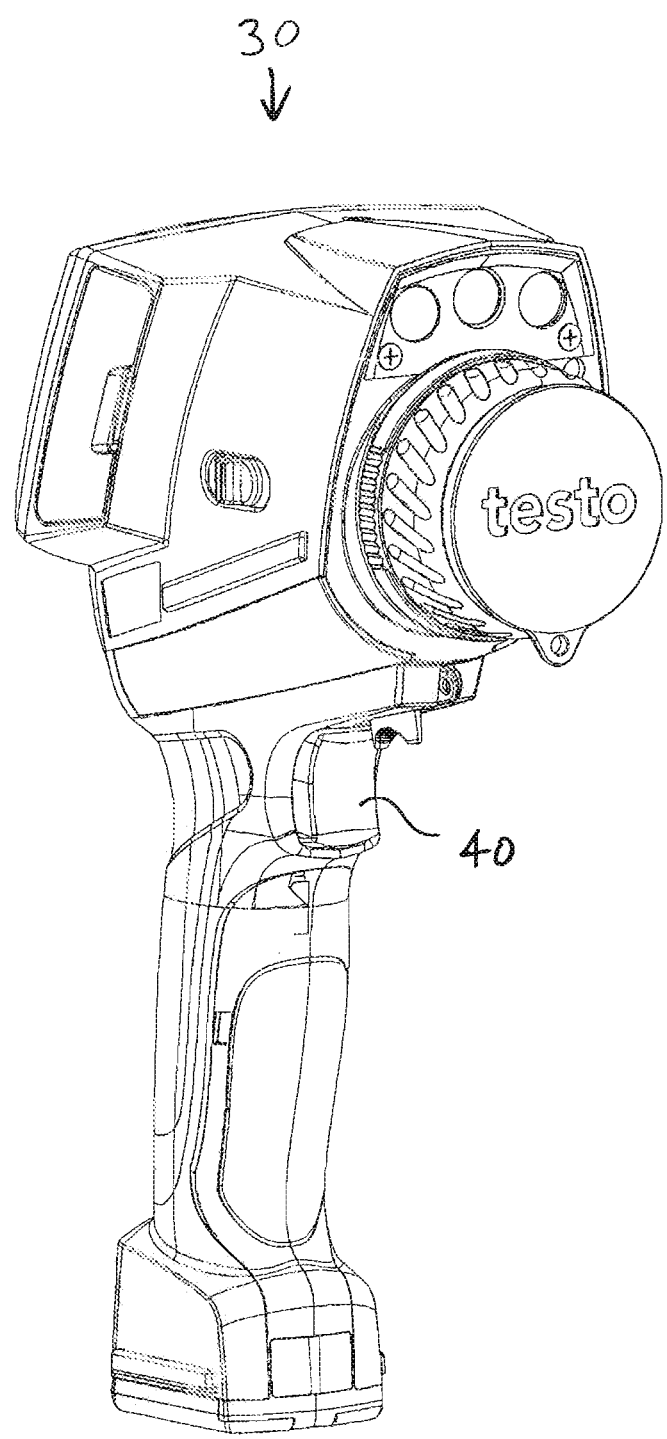
FIGS. 1A and 1B show a thermal imaging camera formed in accordance with the subject invention.
Figure 1B:
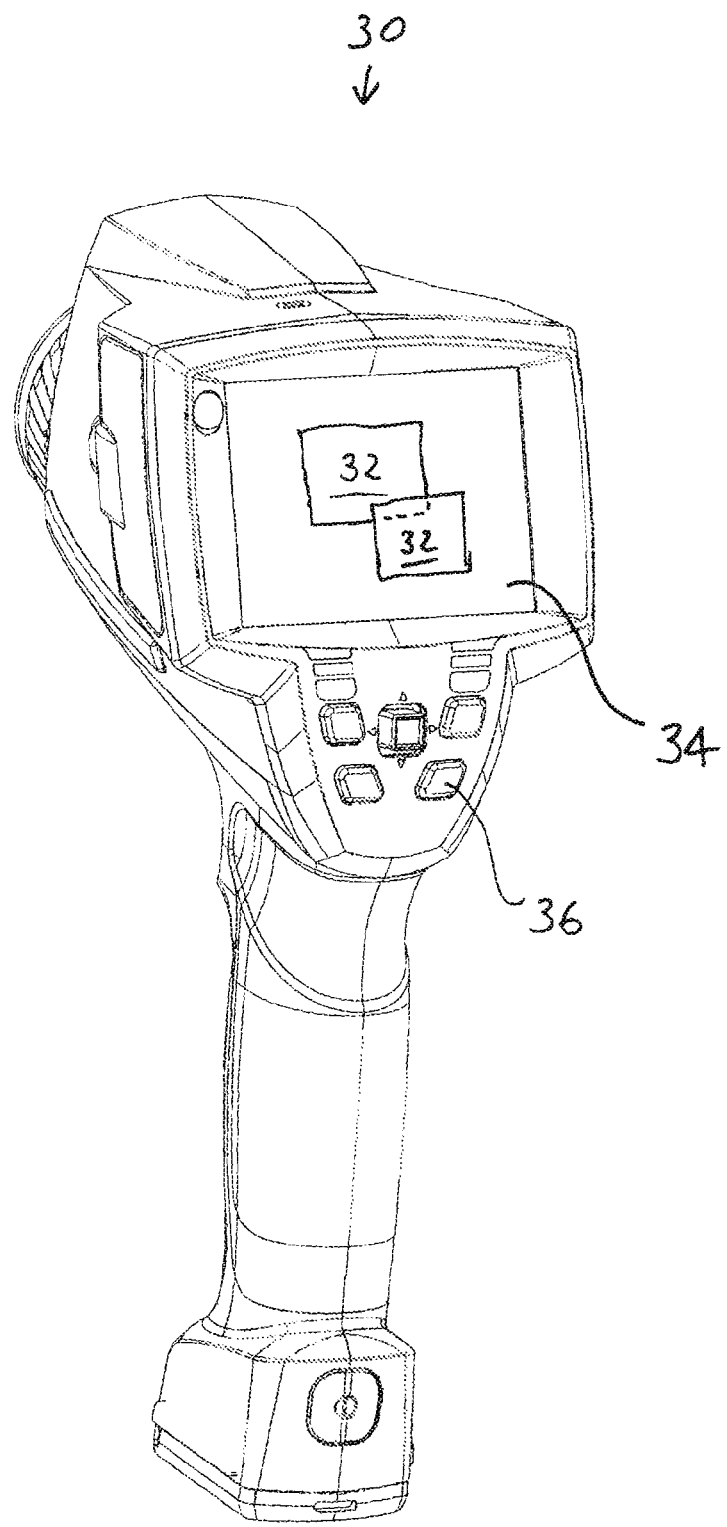

The invention is based on the task of creating a thermal imaging camera that enables the acquisition and display of large solid angle regions with high resolution. FIGS. 1A and 1B provide an example of a thermal imaging camera 30 for use with the invention provided herein.

Figure 2:
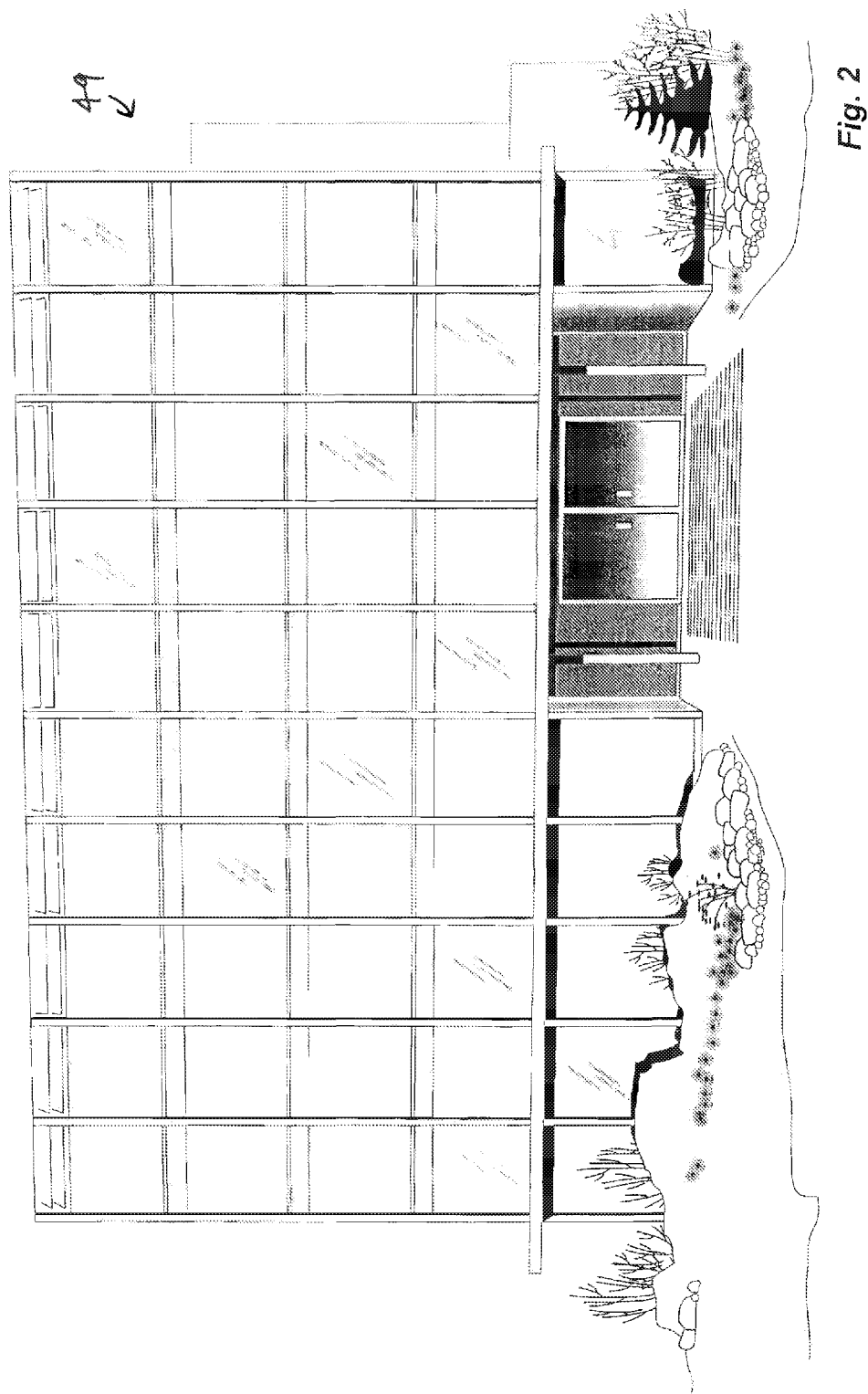
FIG. 2 shows an object which may be at least partially imaged by a thermal imaging camera formed in accordance with the subject invention.

To solve this problem it is provided that an electronic evaluation unit 80 is integrated into the thermal imaging camera 30 of the kind mentioned at the start, with which at least an acquired thermographic image 32 can be stitched with another acquired thermographic image 32 or a stored thermographic image in the edge regions, where the images each repeat the same section of the measurement object in said edge region, to form a new thermographic overall image and can be provided for combined display with the display tool 34, where the display tool 34 has a zoom function 36 for free selection of a segment of the overall image that is to be enlarged. Thus, the measurement object specifies a solid angle region for an overall image, which is minimally divided into partial solid angle regions, where each partial solid angle region corresponds with sufficient overlap to an image to be acquired, and the acquired images 32 are combined into the overall image at the overlappings where they have a corresponding content. It is advantageous in this case that with each additionally acquired image 32, a new overall image can be generated in the thermal imaging camera and the resolution of said image is not limited by the size of the overall image. Thus, a thermal imaging camera is available with which large areas, for example, a building or an industrial plant or a landscape, can be photographed with high resolution, and the focal plane array needs only low resolution, so the manufacturing costs of the thermal imaging camera 30 are considerably reduced. FIG. 2 provides an example of an overall image 50 of the sensor fields taken with the thermal imaging camera 30. The display tool 34 also needs not have to have high requirements with regard to maximum possible resolution of the presentation if the display tool 34 is provided with controls for scrolling and/or zooming 36 (e.g., buttons, joysticks, touch pads) the displayed image.

The thermal imaging camera 30 that has been developed in this way is thus especially suitable for the requirements of building thermography. In particular, a thermal imaging camera 30 that can be used in one-hand operation because of its compact size, for example, at construction sites, is made available with the invention.

Figure 8:
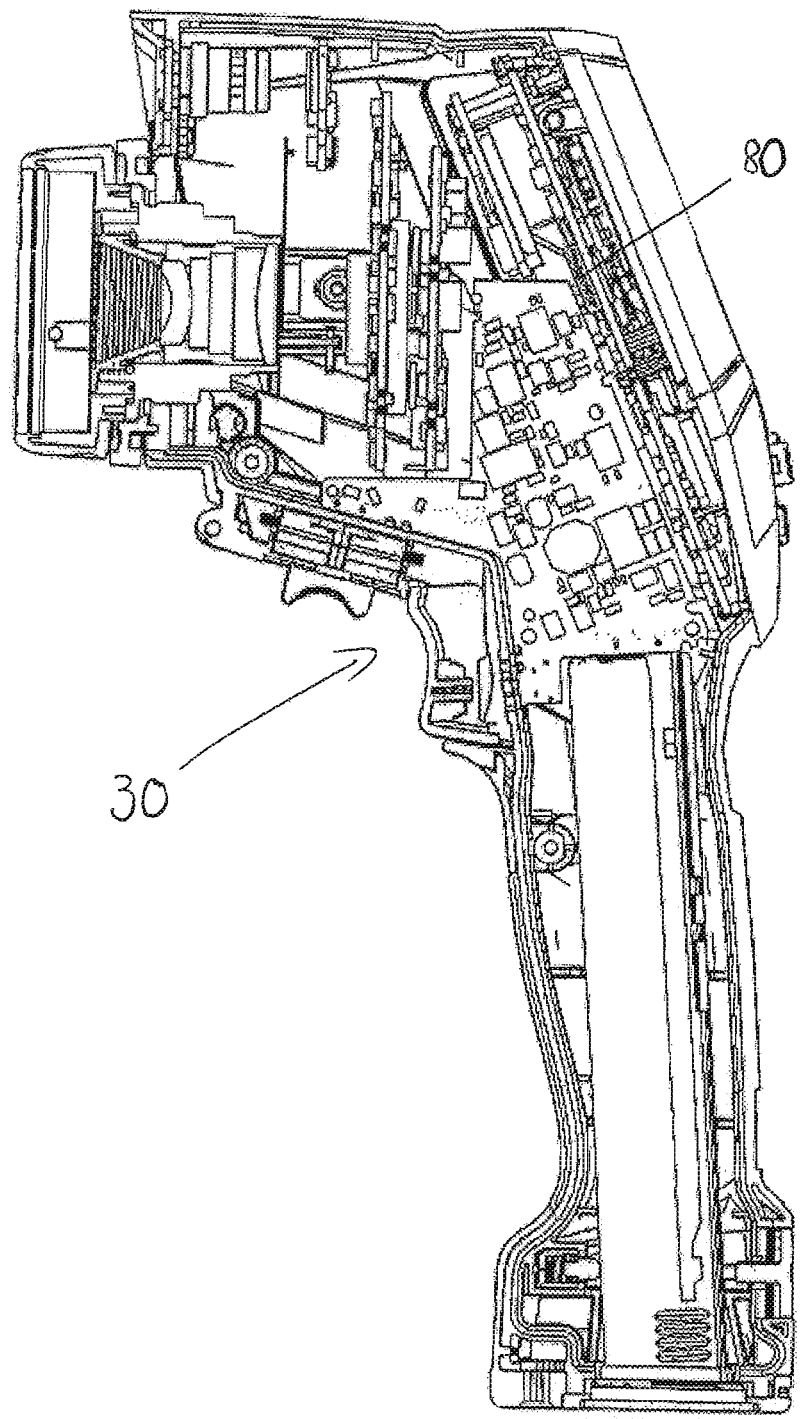
FIG. 8 is a schematic cross-sectional view of a thermal imaging camera formed in accordance with the subject invention.

Preferably, the evaluation unit 80 contains an image recognition tool, with which partial areas with corresponding content can be identified when there is a number of acquired images 32. In FIG. 8, an image recognition tool is integrated into electronic evaluation unit 80.

Figure 3:
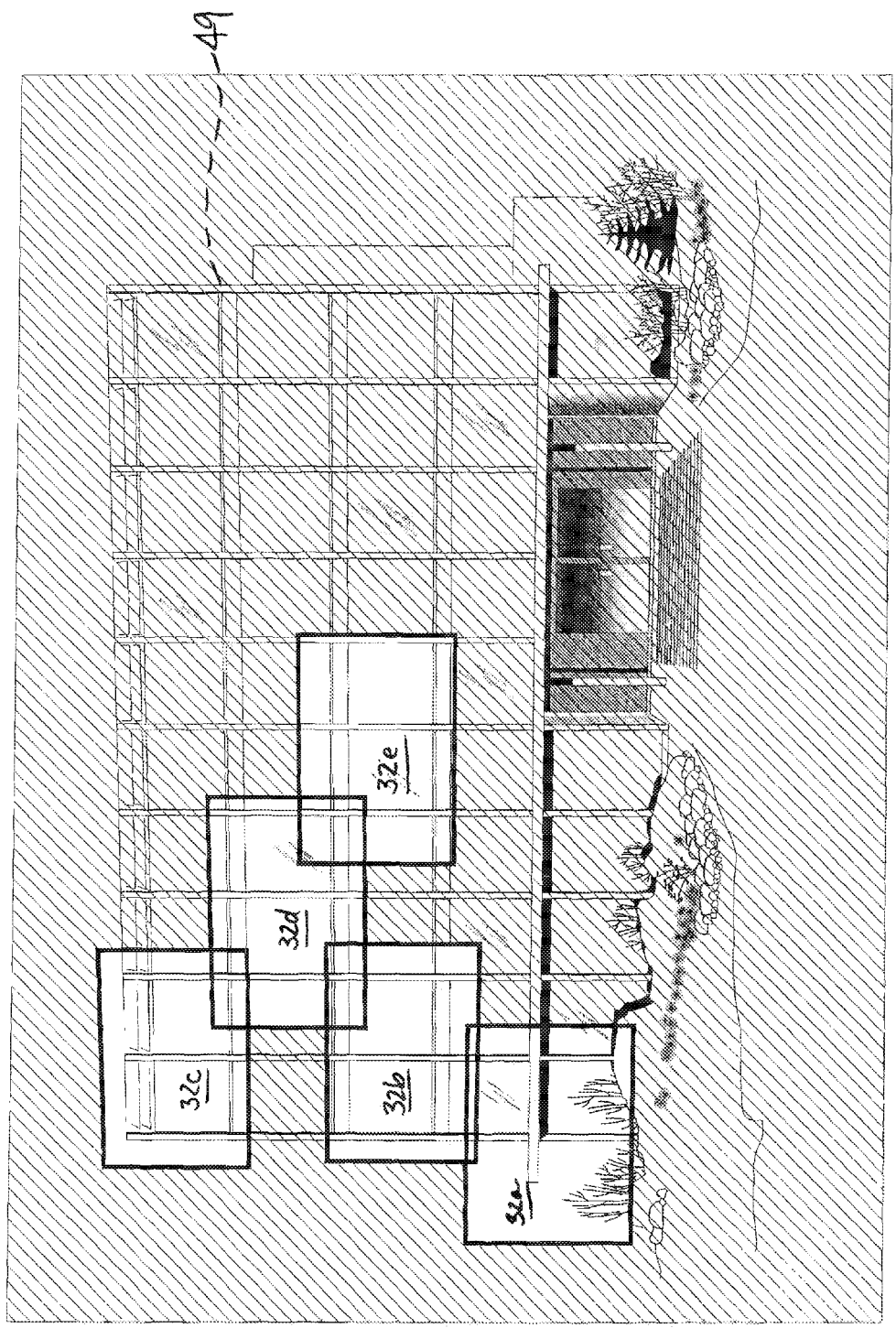
FIG. 3 shows overlapped acquired images.

FIG. 2 shows an object 49 to be at least partially imaged. FIG. 3 (52) shows overlapped acquired images 32 (32a, 32b, 32c, 32d, 32e) taken of portions of the object 49 identified by the image recognition tool, which may be displayed on the display tool 34. The invention takes advantage of the finding that the computational capacity necessary for identification of the corresponding partial regions at which the images are stitched together can be integrated into the thermal imaging camera 30. Additional external computers, or the like, for subsequent processing of acquired images 32 with the goal of generating a stitched overall image 50 (FIG. 5) thus can be omitted. The acquired images 32 are designated as images 1-20, although, as will be appreciated by those skilled in the art, any number of the images 32 may be utilized.

For example, it can be intended that points, lines, edges and/or structures marked with the image recognition tool can be identified. These identified marked points, lines, edges and/or structures do not necessarily correspond to points, lines, edges and/or structures of an image obtained in the visible spectral range and can be used for identification of the corresponding partial regions. More generally, the image recognition tool may be constructed such that it allows to identify image features such as SURF, SIFT or other transformation invariant features that may not be recognizable to the bare eye.

An advantageous embodiment of the invention can provide that partial regions in different images with corresponding content (i.e., identical or substantially similar content) in the horizontal and/or vertical edge regions of the thermographic images can be identified. In this manner, same image regions between different of the acquired images 32 may be identified. It is advantageous in this case that not only a panoramic image, as is well known, for example, in landscape photography, but also an image composed in two dimensions, width and height, can be generated, as is advantageous for the photography of buildings and industrial plants and the like.

For identification of corresponding partial regions in the acquired images 32, it can be provided that the evaluation unit 80 has a tool for pattern recognition. In FIG. 8, a pattern recognition tool is integrated into electronic evaluation unit 80.

For convenient taking of the overall image 50 from the individual acquired images 32, it can be provided that a triggering tool 40 is made, through the actuation of which an additional thermographic image can be taken. For use, thus, the camera is merely aimed at the last segment of the overall region to be photographed and a new image can be produced by means of the triggering tool 40 and the stored, and combined with the already acquired images 32. Preferably it is provided that the display tool 34 of the thermal imaging camera 30 show a timewise continuous image taken in the visible and/or infrared spectral regions. In this way, a swiveling of the thermal imaging camera 30 to a new position can be monitored in the display tool 34 when using the camera 30.

For an optimized display of the image currently being taken and the overall image 50 that has been generated, it can be provided that the enlargement scale of the display is automatically matched to the size of the current overall image 50.

An especially easily portable thermal imaging camera 30 results when the display can simultaneously show the thermographic image acquired in the infrared region and an image acquired in the visible spectral region. A display of this kind can take place, for example, by overlapping the images, or by separate presentation in separate windows, or separate displays.

Preferably, however, it is provided that the thermographic image and the image taken in the visible spectral region can be represented on top of one another and/or overlapping and/or at least partially covering one another and/or fused using α-blending (alpha-blending), so that corresponding image segments from the same parts of the measurement object can be represented at the same site of the display tool 34 and/or in the same display scale. FIG. 3 provides an example of an IR image 52 with five acquired images 32a, 32b, 32c, 32d, 32e, as identified by the image recognition tool, overlapping.

A further improved possibility for generating a stitched image from the individually taken images results when the boundary of an already taken thermographic image, preferably the last acquired thermographic image 32, and/or a thermographic image currently being acquired, can be represented on the display by means of a labeling. Preferably, the labeling can be switched on and off. Through the labeling, a region of overlap can be made recognizable when taken the individual images, for example, by the edge labeling of the acquired image 32 being moved on the display tool 34 when the thermal imaging camera 30 is shifted into a new image-taking position.

According to one embodiment of the invention, the segment of the object photographed is preselected by the user and shown on the display as a black frame.

Figure 5:
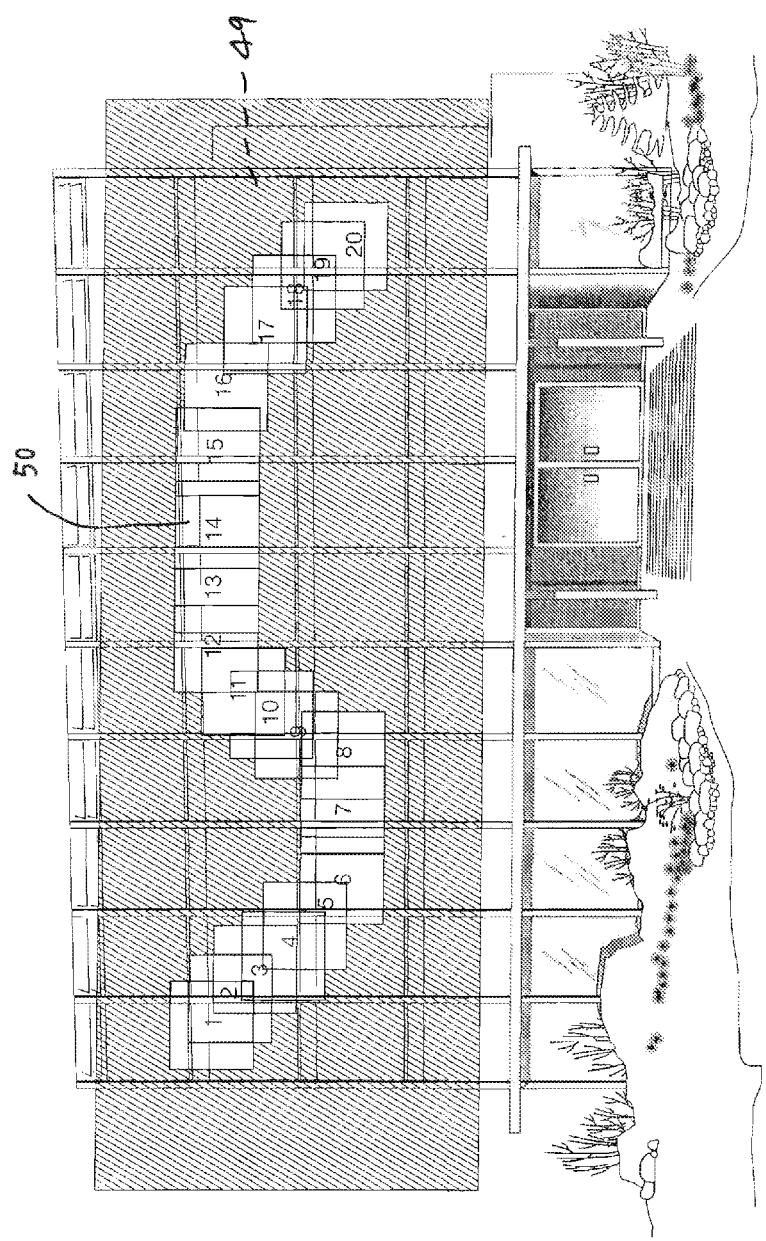
FIG. 5 shows a stitched overall image which may be produced by a thermal imaging camera formed in accordance with the subject invention.

After aiming the camera 30 at the beginning of the scene to be stitched and starting the stitching process, the user swivels the camera 30 in front of the scene and from the frame sequence subsequent frames are stitched together and shown on the display 34 while the camera 30 is swiveled horizontally and/or vertically similar to the brush tool in an image processing program. FIG. 5 illustrates an image with brush-tool-like stitching of the boxes 1-20.

Figure 6:
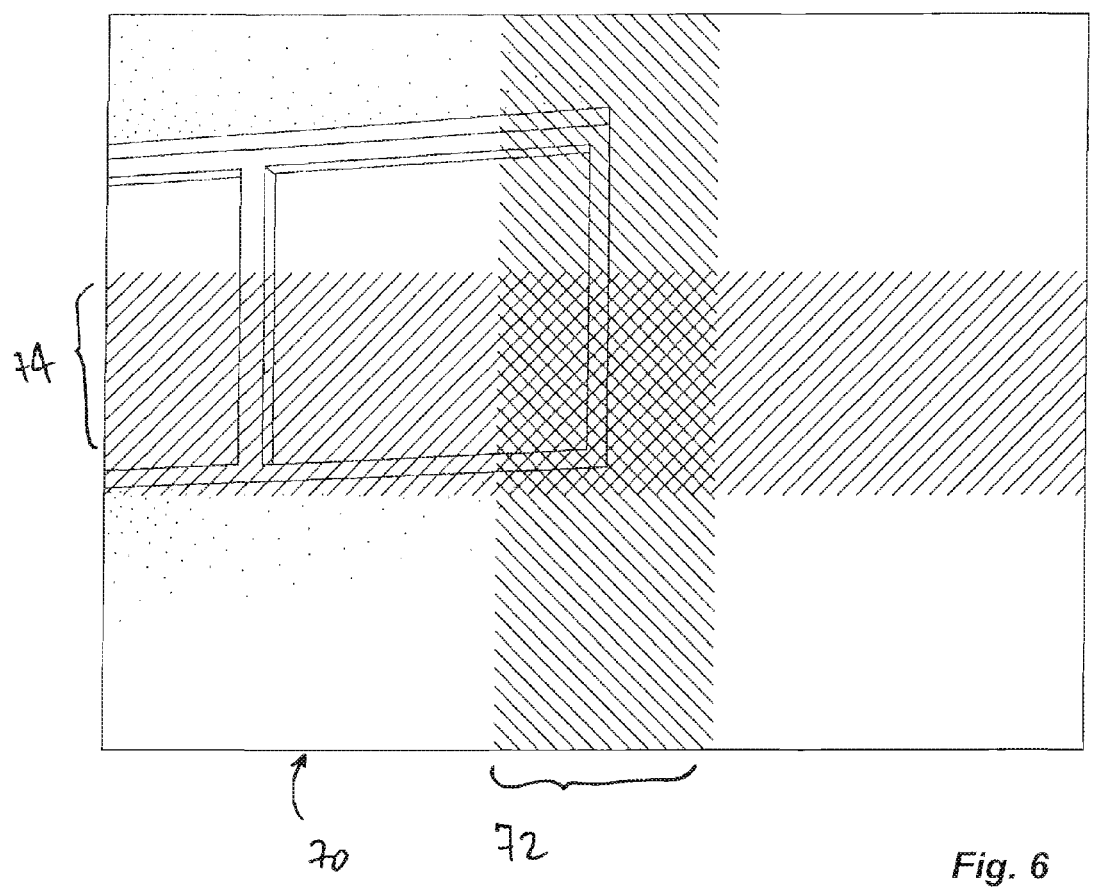
FIG. 6 shows load distortion stripes from image streams used to improve the overall look and feel of a stitched image.

In a further improved realization, low distortion stripes 72, 74 from the image streams are used to improve the overall look and feel of the stitched image, as shown in FIG. 6 (70).

Thermal imaging systems/cameras 30 tend to be afflicted with optical distortions that are mostly caused by the optical lenses. Due to these so called barrel or pincushion distortions, the process of stitching acquired images 32 together to obtain one overall image 50 gets profoundly more complex and computationally expensive. To provide good stitching results it is of essence to remove this distortion field and therefore correct the geometry of the acquired image(s) 32. Using un-corrected images results in loss of detail and accuracy.

This problem scales with the number of acquired images 32 that are going to be stitched together and therefore provides an unwanted obstacle to a video stitching approach where the imaging camera 30 is swiveled over the scene. This distortion correction has to be done in real-time and therefore, increases the overall costs of the computing unit due to its complexity.

The present invention provides a way to avoid this time consuming process and present a real-time video stitching approach for infrared imaging camera devices that is highly scalable and computationally frugal. Our approach takes into account, that the most common distortions that are caused by the shortcomings of low priced optical systems increase their effect on the image depending on the pixel distance of the center of the optical system. This means that there are regions in the acquired images with almost no distortion that could intervene in the stitching process.

The approach of the present invention identifies these regions, either manually or automatically and provides an area where information for the stitching process can be taken without the need to apply a distortion correction to the overall image 50. Having identified this sub-region of the overall image 50 the motion between two or more consecutive frames is determined. The motion determination process is either performed by correlation (cross correlation, normalized cross correlation (CCF/NCCF)), motion filters (Kalman-Filter, etc.), feature-based (SIFT, SURF, LOG, etc.) approaches or motion sensors that provide the needed accuracy. Having determined the actual vector that describes the motion of consecutive frames the new image parts can be determined and added to the overall image 50. Because the imaging system takes many acquired images 32 per second and the swiveling motion of the user is typically small according to the number of frames per second, the movement from one to another pixel is quite small so that there will be a tight information cloud extracted out of the frame sequence that improves the result of the overall image 50 even more. Considering the consecutive frames do have many overlapping regions, the information extracted may be used in the stitching process to obtain the overall image 50 with a temporal noise reduction that is simply done by weighting the addition of the frame parts that are transferred into the overall image 50. This process of intelligent combination of the partial images not only results in a comprehensive overall image 50 with all information of the acquired frame sequence in it but also enhances the signal to noise ratio by filtering noise in the temporal domain.

Swiveling the imaging device over the scene to acquire a frame sequence with which the overall image 50 will be computed one gathers a new problem class that's concerning the image acquisition at different viewpoints. Images taken at different viewpoints from scenes where visible objects differ in their distance to the spectator (imaging device) show deformations in consecutive frames that can't be modeled by simple linear deformation models, such as translation and rotation. By combining such images, the overlap area may not include enough comparable information to compute an overall image 50 with no artifacts.

Our "stripe approach" that segments the image into better comparable parts is robust against such deformations evolving from scenes with objects distrusted at different depths inside the observed scene. Because the considered stripes of consecutive frames of an image sequence do not differ much and therefore have almost the same view points, artifacts will not be visible to the human eye, other than by stitching hole consecutive image frames together. This way an overall image 50 can be obtained which conserves the authentic look and feel of the scene from which it was obtained.

Figure 7:
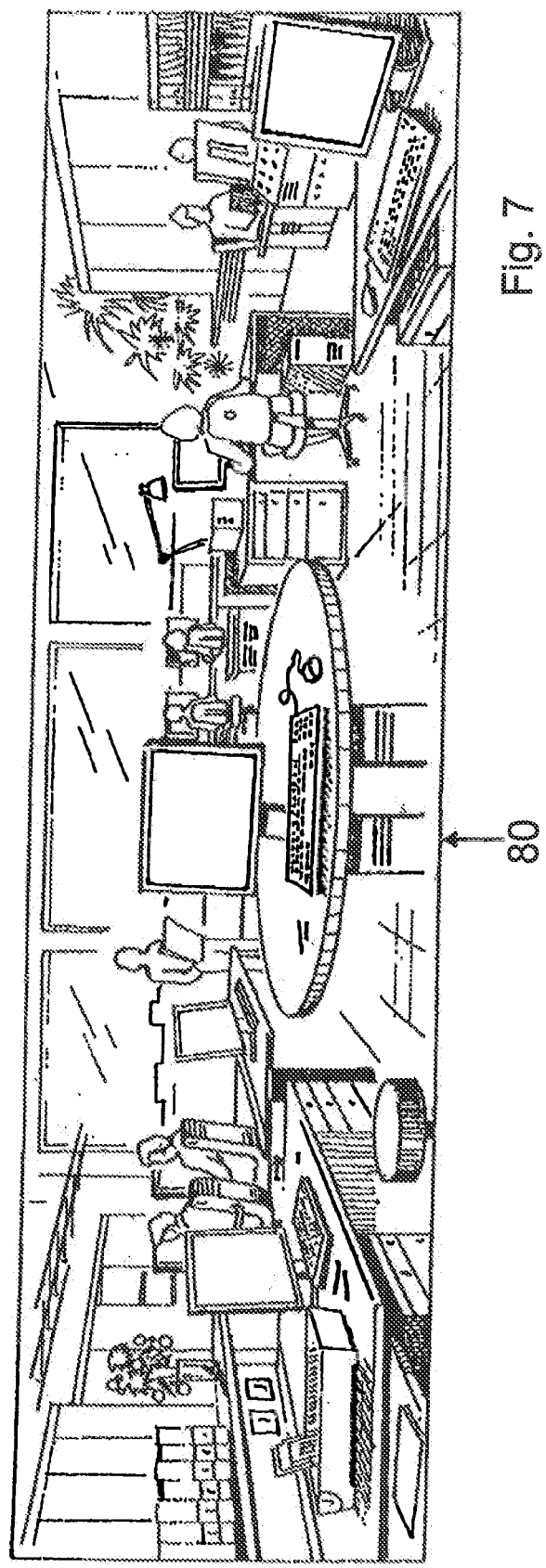
FIG. 7 shows a scene with objects in different distances.

FIG. 7 show the result of the application of the embodiment described above to a 3D scene 80 with objects in different distances from the camera 30. As one may see, the stitching causes distortions to the image, but provides a mechanism that works well for limiting the distortion using the almost undistorted stripes 72, 74. Therefore, the 3D scene is created using acquired images 32.

Preferably, it is provided that the sensor signals of the motion sensor can be detected and evaluated by the evaluation unit.

In one embodiment of the invention, it can be provided that the resolution of the detector field of the thermal imaging camera 30 is lower than the resolution of the display tool 34. Thus thermographic images of high quality, especially resolution, can be made and displayed with the thermal imaging camera 30 without having to use a detector field with high resolution, thus a high pixel count per unit area. Such a detector field is especially undesirable because of its high manufacturing expense and price.

Figure 4:
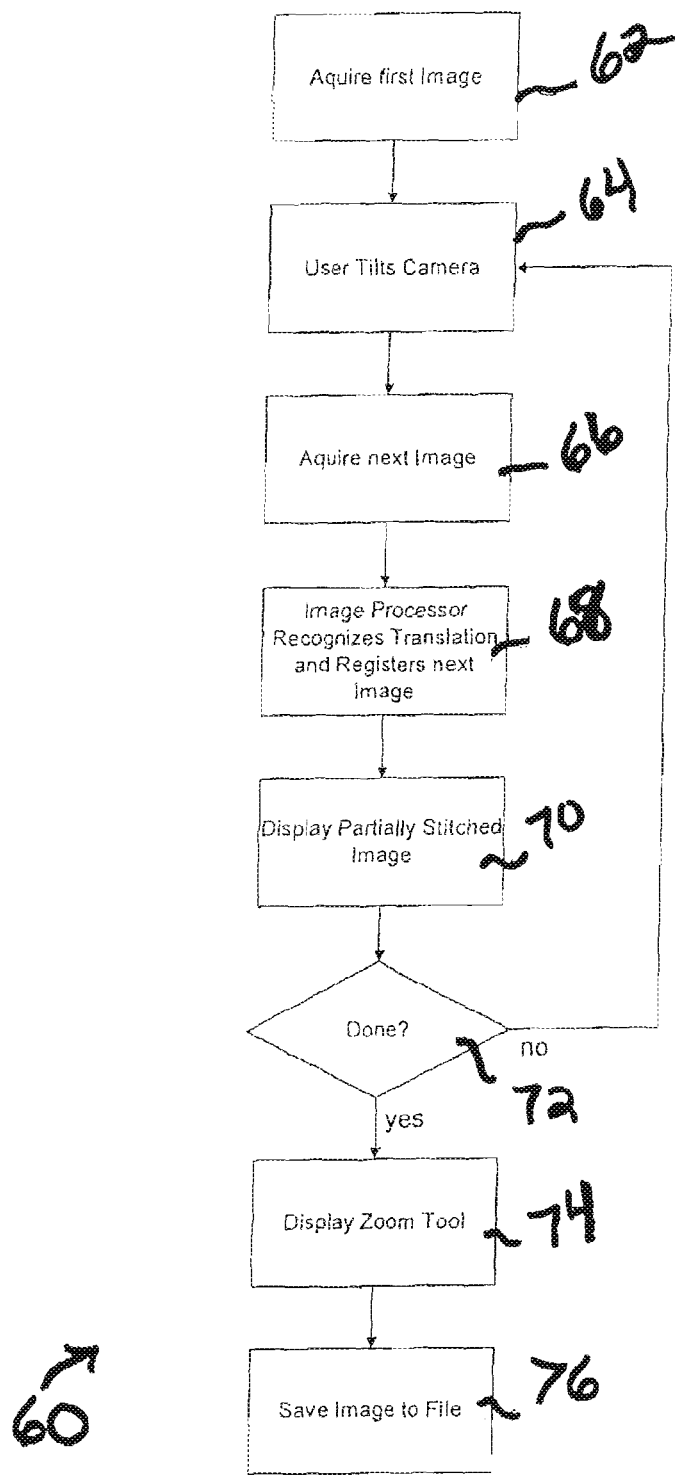
FIG. 4 shows a flow chart of a method useable with the subject invention.

To solve this problem it is provided in a method of the kind mentioned at the start that thermographic images of parts of the measurement object are taken with a thermal imaging camera 30, that in the thermal imaging camera 30 partial regions with corresponding contents are identified in the acquired thermographic images 32, and that the acquired thermographic images 32 are stitched at the identified partial regions into an overall image 50 in the thermal imaging camera 30. FIG. 4 provides an example method 60.

Preferably, it is provided that the assembled overall image 50 is represented on a display tool 34 in the thermal imaging camera 30.

According to one embodiment of the invention, it can be provided that the represented overall image 50 is made appropriately current when taking an additional thermographic image by adding the additionally taken image to it. It is advantageous in this case that the generated overall image 50 can be immediately checked and that individual images that are still missing in the overall image 50 or that were insufficiently acquired can be immediately acquired after that.

To support the identification of corresponding partial regions, it can be provided that the thermal imaging camera 30 has a motion sensor (not shown) and that the measurement signals of the motion sensor are used by the evaluation unit to identify partial regions with corresponding contents. It is advantageous here that the thermal imaging camera 30 can, due to the sensor signals of at least one of one motion sensor (there is preferably at least one sensor provided for each independent direction of motion of the thermal imaging camera 30) make an assessment of the point at which corresponding partial regions could arise in the case of successively taken individual images. This can save computational capacity, which simplifies the instruction of the thermal imaging camera 30.

Using the method 60 of FIG. 4, an especially easy possibility of generating the overall image 50 can provide that the acquisition of the thermographic images 32 in steps 62 and 66 and/or the formation of the overall image 50 on the display tool takes place in real time during a swivel motion of the thermal imaging camera 30 in step 64.

For dynamic adjustment to partial regions of the overall image 50 that are of interest (and not of interest), it can be provided in step 68 that the resolution can be set for each acquisition of the thermographic images 32 in step 70. In this way, storage capacity and computational capacity in the thermal imaging camera 30 can be saved in step 76. Preferably, a tool for selecting the resolution, for example, a zoom function 36, as provided in step 74, for the currently acquired image 32 can be built into the thermal imaging camera 30.

To make use of the full resolution of the thermographic image that results from the assembly of individual images, it can be provided that a freely selectable image segment of the overall image 50 is enlarged on the display tool 34 of the thermal imaging camera 30 with a zoom function 36.

To carry out the method, the necessary tools and elements are built into a thermal imaging camera 30. For example, it can be provided that a thermal imaging camera 30 in accordance with the invention is used to carry out the method.

An electronic evaluation unit, provided in step 72, is integrated into the thermal imaging camera 30 for taking thermographic images of a measurement object; it is designed to recognize overlapping partial regions 32a, 32b, 32c, 32d, 32d of acquired thermographic images 32, and with it, the acquired images 32 can be assembled into an overall image 50 and displayed by overlapping corresponding partial regions. The acquisition of the image 32 takes place preferably during the swiveling of the thermal imaging camera 30 over the solid angle region of the desired overall image 50.

The invention claimed is:

1. A thermal imaging camera for taking thermographic images of a measurement object in the infrared region, with a display tool built in or on the housing for a representation of the acquired thermographic images, where the thermal imaging camera is made as a hand-held unit configured to acquire thermographic images with a swiveling motion of the thermographic camera, said thermal imaging camera comprising an electronic evaluation unit configured to stitch at least one acquired thermographic image with another thermographic image, where the images each repeat a same image region of the measurement object, said thermographic images being stitched about said same image regions to form a thermographic overall image that can be displayed with the display tool, with correction being made for the swiveling motion of the thermal imaging camera by assembling the acquired thermographic images using a set of undistorted stripes configured to limit distortion of the acquired thermographic images, where the display tool has a zoom function for free selection of an image segment of the overall image that is to be magnified.

2. A thermal imaging camera as in claim 1, characterized by the fact that the evaluation unit contains an image recognition tool with which partial regions with the same image regions can be identified when there is a number of acquired thermographic images.

3. A thermal imaging camera as in claim 2, characterized by the fact that the same image region may extend horizontally.

4. A thermal imaging camera as in claim 3, characterized by the fact that the same image region may extend vertically.

5. A thermal imaging camera as in claim 2, characterized by the fact that the same image region may extend vertically.

6. A thermal imaging camera as in claim 1, characterized by the fact that the evaluation unit has a tool for pattern and/or feature recognition.

7. A thermal imaging camera as in claim 1, characterized by the fact that the thermal imaging camera includes a trigger configured such that through the actuation of which a thermographic image can be taken.

8. A thermal imaging camera as in claim 1, characterized by the fact that the scale of magnification of the display tool is automatically adjusted to the size of the current overall image.

9. A thermal imaging camera as in claim 1, characterized by the fact that a representation of the thermographic image acquired in the infrared spectral region and an image acquired in the visible spectral region can be represented at the same time by the display tool.

10. A thermal imaging camera as in claim 9, characterized by the fact that the thermographic image and the image acquired in the visible spectral region can be represented at least partially covering one another and/or $\alpha$-blended, so that image segments of the same parts of the measurement object that correspond to each other can be represented at the same point on the display tool and/or in the same display scale.

11. A thermal imaging camera as in claim 1, characterized by the fact that the boundary of an already acquired thermographic image, and a currently acquirable thermographic image can be represented on the display tool by means of a switchable labeling.

12. A thermal imaging camera as in claim 1, characterized by the fact that the segment of the measurement object acquired in the visible spectral region is larger than the segment of the measurement object acquired with an individual and/or with the assembled thermographic image.

13. A thermal imaging camera as in claim 1, characterized by the fact that the acquisition of the thermographic images takes place by means of an uncooled sensor field.

14. A thermal imaging camera as in claim 1, characterized by the fact that at least one motion sensor, with which the swiveling motion of the thermal imaging camera can be detected, is integrated into the thermal imaging camera.

15. A thermal imaging camera as in claim 14, characterized by the fact that the sensor signals of the motion sensor can be detected and evaluated by the evaluation unit.

16. A thermal imaging camera as in claim 1, characterized by the fact that the resolution of the detector field of the thermal imaging camera is smaller than the resolution of the display tool.

17. A thermal imaging camera as in claim 1, characterized by the fact that the acquisition of the thermographic images and the construction of the overall image takes place in real time during the swiveling motion of the thermal imaging camera.

18. A thermal imaging camera as in claim 1, characterized by the fact that the overall image is appropriately updated when an additional thermographic image is acquired by adding the additionally acquired image.

19. A thermal imaging camera as in claim 1, characterized by the fact that the resolution of the thermographic camera can be preset for each acquisition of thermographic image.

20. A thermal imaging camera as in claim 1, wherein the evaluation unit is configured to identify regions of the acquired thermographic images requiring correction for optical distortion.

* * * * *